United States Patent Office 3,536,682
Patented Oct. 27, 1970

3,536,682
SELF-EMULSIFIABLE ETHYLENE POLYMER
COMPOSITIONS
Francis E. Brown, Shawnee, Kans., and Harry D. Anspon, Kansas City, Mo., assignors to Gulf Research & Development Company, Pittsburgh, Pa., a corporation of Delaware
No Drawing. Filed Mar. 4, 1968, Ser. No. 709,922
Int. Cl. C08f 15/02
U.S. Cl. 260—86.7
14 Claims

ABSTRACT OF THE DISCLOSURE

Water-insoluble, self-emulsifiable ethylene polymers are prepared by the continuous one-step copolymerization and hydrolysis of ethylene and fumarate, maleate, itaconate, or acrylate esters. By introducing an aqueous solution of alkali metal base for hydrolysis downstream from the point of monomer introduction, the tendency of the comonomer to form a hydrolyzed homopolymer is reduced and copolymerization takes place prior to the hydrolysis of the pendant substituent groups. Optionally, a nitrogenous base can also be introduced, preferably downstream of the point of introduction of the alkali metal base, to convert the ester groups to the corresponding amide form.

Background of the invention

This invention relates to the preparation of water-insoluble, self-emulsifiable ethylene polymer compositions. In another aspect this invention relates to the copolymerization of ethylene and a monomer selected from the group consisting of the fumarate, maleate, itaconate and acrylate esters and the hydrolysis of the produced copolymers to provide water-insoluble, self-emulsifiable ethylene polymer compositions. In yet another aspect, this invention relates to the one-step copolymerization and hydrolysis of ethylene and a monomer selected from the group consisting of the fumarate, maleate, itaconate and acrylate esters to produce water-insoluble, self-emulsifiable ethylene polymer compositions.

Copolymers of ethylene and alkyl acrylates, fumarates, itaconates or maleates have heretofore been conventionally prepared by a continuous high pressure bulk polymerization process. This process normally comprises the continuous introduction of ethylene and the selected ester feed into a polymerization reaction zone. The polymerization reaction is conducted in the presence of a polymerization-inducing quantity of a free-radical initiator, employing polymerizing temperatures and pressures, with a product copolymer being recovered from the reaction chamber.

In the preparation of water-insoluble, self-emulsifiable copolymers of ethylene, the above-described ethylene copolymers have conventionally been subjected to a hydrolysis reaction wherein the feed copolymers are contacted in an aqueous medium with a metallic base, and optionally, a nitrogenous base to hydrolyze a self-emulsifying inducing portion of the ester groups to the hydrophylic form. Conventionally, such hydrolysis reactions have been conducted in batch reactors with close control of feed ratios and other hydrolysis reaction parameters.

It would be highly desirable to provide a convenient, economically-feasible continuous process wherein water-insoluble, self-emulsifiable polymers of ethylene could be produced in a single reaction vessel wherein the copolymerization and hydrolysis reactions are conducted substantially simultaneously.

Accordingly, an object of the invention is to provide an improved process for the preparation of water-insoluble, self-emulsifiable ethylene polymer.

Another object of the invention is to provide an improved continuous process for the copolymerization of ethylene and a comonomer selected from the group consisting of fumarate, maleate and acrylate esters and the hydrolysis of the product copolymer to provide a water-insoluble, self-emulsifiable ethylene polymer.

Yet another object of the invention is to provide a continuous process wherein the copolymerization of ethylene and a selected monomer and hydrolysis of the product copolymer is conducted in a single reaction chamber to provide a water-insoluble, self-emulsifiable ethylene polymer.

Other objects, advantages and features of the invention will be readily apparent to those skilled in the art from the following description and the appended claims.

"Water-insoluble" as used herein refers to the inability of the fused solid ethylene polymer to become substantially dissolved in water as measured, for example, by preparing a ½ mil cast film of the product polymer by conventional methods, placing a 10 x 10 centimeter sample in one liter of water maintained at a temperature of 30° C. for a period of 24 hours, removing the film from the water, drying the film to a constant weight at 120° C., and determining that the weight loss in the film when compared to the weight of the original film sample shall be less than 10 weight percent. "Self-emulsifiable" as used herein refers to that property of the product polymer whereby 1 gram of the polymer in particular form can be readily dispersed in 100 ml. of water in a stirred metal autoclave maintained at a temperature in the range of 180 to 300° C. to provide, in the absence of an emulsifying agent, a shelf-stable dispersion wherein the average particle size is less than 2 microns. "Shelf-stable" as used herein refers to the lack of a significant change in the appearance of aqueous dispersions of the ethylene polymers after 48 hours' standing and customarily even after 30 days' storage in a conventional glass container at ambient room temperatures.

Summary of the invention

By the invention there is provided a continuous process for the preparation of water-insoluble, self-emulsifiable ethylene polymers which comprises contacting in a single reaction chamber, under controlled polymerization conditions as hereinafter defined, a mixture comprising ethylene, a comonomer selected from the class consisting of dialkyl fumarates, dialkyl maleates, itaconates and alkyl acrylates, a monovalent metallic base, optionally a nitrogenous base, and a free-radical generating polymerization initiator, and thereafter separating a water1insoluble, self-emulsifiable ethylene polymer from the reaction mixture.

The ethylene polymers provided by the process of this invention have wide utility. Product polymers can be extruded, molded or readily formed into film, exhibiting excellent flexibility. Additionally, aqueous dispersions of the product ethylene polymers can be employed as an ingredient in paints, paper coating compositions, polishes and the like. As to paints the required pigments, thickener and other agents can be added dry to the aqueous dispersions.

Coated paper resulting from one or more applications of an aqueous dispersion of the product ethylene polymers and prepared by conventional paper coating techniques known in the art, show good moisture-vapor transmission values. Surprisingly, the coating of the paper exhibits a high resistance to creasing without great loss of resistance to water transmission. Aqueous dispersions of the product ethylene polymers are particularly applicable in the treatment of fabrics. When so employed, the ethylene polymers of the aqueous dispersions have been shown to have excellent ability to bind the pigment to the cloth, have shown good retention on water washing and on dry cleaning the cloth, and on other desired properties.

DESCRIPTION OF THE INVENTION

The product ethylene polymers prepared by the inventive process are water-insoluble, self-emulsifiable and are comprised of ethylene and from 10 to 60 percent by weight of a comonomer selected from the group consisting of alkyl fumarates, alkyl maleates, alkyl itaconates and alkyl acrylates. The alkyl acrylates include the alkyl esters of unsubstituted crylic acid or of an α-substituted acrylic acid, such as methacrylic acid. Presently preferred comonomers are the lower alkyl fumarates, maleates, itaconates and acrylates wherein substituted alkyl groups contain up to 6 carbon atoms.

In a first embodiment of the invention ethylene is continuously introduced into a reaction zone within a reaction vessel, said polymerization zone maintained at a polymerization temperature and pressure. "Reaction zone" as herein employed refers to the area enclosed within a single reaction vessel. The reaction vessel may contain baffle means for agitating the reaction mixture but there must be open communication throughout the reaction zone.

Generally, the reaction temperatures and pressures employed in the process of this invention are those conventionally maintained in high-pressure, free-radical initiated ethylene homopolymerization processes. Pressures in the range of from about 10,000 to about 30,000 p.s.i.g. typically, and preferably of from about 15,000 to 20,000 p.s.i.g., are maintained in the reaction zone and reaction temperatures are typically maintained within the range of from about 200 to 500° F. The specific reaction temperature and reaction pressure to be employed in the process is dependent upon the specific properties of the polymer desired and the particular polymerization initiator employed.

The free-radical generating polymerization initiators employed in the process of the invention can be those conventionally employed in high-pressure ethylene homopolymerization processes such as ditertiarybutyl peroxide, tertiarybutyl peracetate and tertiarybutyl perbenzoate. Preferably suitable initiators which can be employed have half-lives of from about 5 to 50 minutes and desirably from about 20 to about 40 minutes at 185° F. as determined by the method of Doehnert and Magelli, Modern Plastics, 36, 142 (February 1959). Examples of such initiators include lauroyl peroxide, decanoyl peroxide, caprolyloyl peroxide, tertiarybutyl peroxy pivalate, and α-α'-azobisisobutyronitrile.

The initiators employed herein are introduced into the reaction zone in any suitable manner, for example, by dissolving the initiator in a suitable solvent and injecting the solvent solution of the initiator directly into the reaction zone. Alternatively, the initiator can be injected into the ethylene feed stream or the comonomer feed stream prior to introduction thereof into the reaction zone.

The metallic base employed in the process of the invention is an alkali metal base. An aqueous solution of the alkali metal base, preferably sodium hydroxide or potassium hydroxide, is introduced into the reaction zone at the point of introduction of ethylene, comonomer, and polymerization initiator or downstream of such point. The downstream introduction reduces the tendency of the comonomer to form a homopolymer of the hydrolyzed comonomer in the presence of water and permits the copolymerization step to occur prior to the hydrolysis of the pendant substituent groups. As the copolymerization rate greatly exceeds the hydrolysis rate, the preferred point of introduction of the alkali metal base can be substantially adjacent to but downstream of the point or points of introduction of the ethylene initiator and comonomer. Preferably, the aqueous solution of the alkali metal base is introduced into the downstream 50 percent portion of the reaction zone.

The aqueous solution of the alkali metal base is introduced into the reaction zone at a rate sufficient to hydrolyze from about 10 to about 75 mol percent, preferably not to exceed 50 mol percent of the pendant substituent groups to the carboxylate salt form. Generally, the aqueous solution of the alkali metal base is introduced into the reaction zone at a rate sufficient to maintain a 10-75 mol percent concentration of the alkali metal based upon the mol concentration of comonomer within the reaction zone. Preferably, the concentration of water in the hydrolysis region is limited to that quantity required to maintain the alkali metal base in an aqueous solution within the hydrolysis region.

The above-described copolymerization and hydrolysis reactions can be conducted in the presence of an additive compound which retards or controls the copolymerization of ethylene and the selected comonomer. Preferably the additive compound can be selected from the class of nuclearly-substituted phenols, biphenols and bisphenols described in U.S. Pat. 3,349,072, issued Oct. 24, 1967. As disclosed in U.S. 3,349,072, the polymerization inhibitors which can be employed in the polymerization processes are the nuclearly-substituted phenols, biphenols and bisphenols wherein each phenolic nucleus has at least one substitutent selected from the class consisting of hydroxy, carboxyl, carbonyl, nitro, amino, aminoloweralkyl, loweralkylamino, lower alkyl, lower alkenyl, lower alkoxy and lower alkacyl groups. Such an inhibitor can be employed alone or in mixture with one or more other inhibitors of this type.

The additive compound employed to prevent the formation of supermolecules through intramolecular transfer within the reaction zone can be injected directly into the reaction zone upstream of the introduction of the alkali metal base or, alternatively, the additive compound can be premixed with the initiator, if separately injected, or with either the ethylene or the comonomer feed streams. The quantity of additive compound employed will vary somewhat in accordance with the specific type of comonomer involved, the ratio of comonomer to ethylene employed, and, to a degree, upon the specific conditions of pressure and temperature selected. In general, an amount of from about 0.00005 to about 0.00018 mol of additive compound per mol of feed to the polymerization zone (ethylene plus comonomer) is sufficient and effective to substantially prevent explosive decompositions. Suitable specific amounts of additive compound may be established by routine experiments for any specific set of polymerization conditions. Additive compounds found to be particularly applicable in the process of this invention are 2,6-ditertiarybutyl-4-ethyl phenol and 2,6-ditertiarybutyl-4-methyl phenol.

A reaction mixture containing a water-insoluble, self-emulsifiable ethylene polymer containing pendant substituent groups in carboxylate salt form and in ester form is continuously withdrawn from the reaction vessel. It is necessary that in order to obtain the desired polymer flow characteristics that conversion of the pendant substituent groups to the carboxylate salt form be limited to a maximum of about 75 mol percent. In addition to pendant carboxylate salt groups, the product ethylene polymer can also contain pendant carboxylic acid groups.

In a second embodiment of the invention, a nitrogenous base is introduced into the reaction zone downstream of the point or points of injection of ethylene, initiator and comonomer into the reaction zone. This introduction of a nitrogenous base is in addition to the employment of an alkali metal base in the reaction. The nitrogenous base employed is selected from the group consisting of an ammonia and primary and secondary amines capable of converting the ester groups to the corresponding amide form. Illustratively, lower mono and di-alkyl substituted amines such as methylamine, ethylamine, isopropylamine, diethylamine, ethanolamine, octylamine, and the like, can be employed. Although the nitrogenous base can be introduced into the reaction zone together with the alkali metal base, it is preferred to introduce the nitrogenous base into the reaction zone downstream of the point of introduction of the alkali metal base, thereby reducing the effect of the nitrogenous base upon the initiator employed. The concentration of nitrogenous base introduced into the reaction zone is preferably limited to that required to amidize not more than about 40 mol percent of the ester groups to the amide form. Reaction temperatures, pressures and all other process parameters as set forth in the first embodiment are applicable in the second embodiment unless otherwise stated.

The effluent continuously withdrawn from the reaction vessel will contain a product water-insoluble, self-emulsifiable ehylene polymer having a portion of the substituent pendant groups in amide form, a portion of the substituent groups in carboxylate salt form, a portion of the substituent groups in ester form and, otionally, a portion of the pendant substituent groups in carboxylic acid form.

The product ethylene polymer containing the above-defined pendant substituent groups can be separated from unreacted ethylene monomer by conventional separation methods.

The following examples are presented to illustrate the objects and advantages of the invention. It is not intended, however, that the invention should be limited to the specific embodiments presented therein.

EXAMPLE I

In this example ethylene is continuously introduced into the top of a vertical reactor at a rate and pressure sufficient to maintain a presssure of 20,000 p.s.i.g. within the reactor. Methyl acrylate at the rate of 2.5 mol percent of the ethylene feed is introduced into the top of the reactor through the ethylene gas inlet conduit. An aqueous solution of sodium hydroxide is introduced independently into the upper region of the vertical reactor but downstream of the ethylene gas inlet at a rate of 2.5 mol percent of the ethylene feed. Decanoyl peroxide is introduced into the top of the vertical reactor at a rate sufficient to maintain a temperature of 360° F. within the reactor. An effluent mixture is continuously withdrawn from the bottom of the reactor.

Infrared analysis of a film prepared from the polymer product withdrawn from the reactor indicates the production of a terpolymer within the reactor comprising 89.4 weight percent ethylene, 8.0 weight percent sodium acrylate and 2.6 weight percent methyl acrylate.

EXAMPLE II

In this example the process of Example I is repeated with the exception that methyl acrylate is introduced into the reactor at a rate of 3.05 mol percent of the ethylene feed. Infrared analysis of a film produced from the polymer recovered from the reactor indicates the formation of a terpolymer comprising 75.2 weight percent ethylene, 13.5 weight percent sodium acrylate and 11.3 weight percent methyl acrylate.

EXAMPLE III

The ethylene polymer products recovered in Examples I and II are readily dispersed in water at 250° C. to form a shelf-stable dispersion of the ethylene polymer.

Although the invention has been described with reference to specific materials, embodiments and details, various modifications and changes, within the scope of this invention, will be apparent to one skilled in the art and are contemplated to be embraced in the invention.

We claim:
1. In a process which comprises continuously introducing ethylene into a reaction zone, continuously introducing a comonomer selected from the group consisting of alkyl acrylates, dialyl fumarates, dialkyl maleates and dialkyl itaconates into said reaction zone, introducing a free-radical generating polymerization initiator into said reaction zone, and maintaining a polymerization temperature and a polymerization pressure within said reaction zone; the improvement in said process comprising in combination therewith the steps of introducing an aqueous solution of an alkali metal base into said reaction zone downstream of the introduction of said ethylene, comonomer, and initiator and at a rate sufficient to hydrolyze to the carboxylate salt form from 10 to 75 mol percent of the substituent groups of said comonomer, maintaining a concentration of water in said reaction zone substantially limited to that required to maintain said alkali metal base in aqueous solution, and continuously withdrawing from said reaction zone a polymer comprising from 40 to 90 weight percent ethylene and said comonomer and wherein a portion of the substituent comonomer groups is in alkali metal salt form.

2. The process of claim 1 wherein the concentration of substituent groups in carboxylate salt form does not exceed 50 mol percent.

3. The process of claim 1 wherein the alkali metal base is selected from the group consisting of sodium hydroxide and potassium hydroxide.

4. The process of claim 1 wherein said comonomer is an alkyl acrylate.

5. The process of claim 1 to include the step of introducing into said reaction zone an additive compound selected from the class consisting of nuclearly-substituted phenols, biphenols and bisphenols wherein each phenolic nucleus has at least one substituent selected from the group consisting of hydroxy, carboxyl, carbonyl, nitro, amino lower alkyl, lower alkyl amino, lower alkyl, lower alkenyl, lower alkoxy and lower alkacyl groups.

6. In a process which comprises continuously introducing ethylene into a reaction zone, continuously introducing a comonomer selected from the group consisting of alkyl acrylates, dialyl fumarates, dialkyl itaconates and dialkyl maleates into said reaction zone, introducing a free-radical generating polymerization initiator into said reaction zone, and maintaining a polymerization temperature and a polymerization pressure within said reaction zone; the improvement in said process comprising in combination therewith the steps of introducing an aqueous solution of an alkali metal base into said reaction zone downstream of the introduction of said ethylene, initiator and comonomer at a rate sufficient to hydrolyze to the carboxylate salt form from 10 to 75 mol percent of the substituent groups of said comonomer, maintaining a concentration of water in said reaction zone substantially limited to that required to maintain said alkali metal base in aqueous solution, introducing a nitrogenous base into said reaction zone downstream of the introduction of said ethylene, initiator and comonomer, and withdrawing from said reaction zone a polymer comprising from 40 to 90 weight percent ethylene and said comonomer and wherein a portion of the substituent groups of said comonomer is in alkali metal salt form and a portion of said comonomer substituent groups is in amide form.

7. The process of claim 6 wherein said nitrogenous base is introduced into said reaction zone downstream of the introduction of said alkali metal base.

8. The process of claim 6 wherein said comonomer is an alkyl acrylate.

9. The process of claim 6 to include the step of introducing into said reaction zone an additive compound selected from the class consisting of nuclearly-substituted phenols, biphenols and bisphenols wherein each phenolic nucleus has at least one substituent selected from the group consisting of hydroxy, carboxyl, carbonyl, nitro, amino lower alkyl, lower alkyl amino, lower alkyl, lower alkenyl, lower alkoxy and lower alkacyl groups.

10. The process of claim 7 wherein said alkali metal base is selected from the group consisting of sodium hydroxide and potassium hydroxide.

11. The process of claim 10 wherein said nitrogenous base is ammonia.

12. The process of claim 1 wherein the polymerization pressure is maintained in the range of 10,000 to about 30,000 p.s.i.g. and wherein said polymerization temperature is maintained in the range of 200 to 500° F.

13. The process of claim 6 wherein the polymerization pressure is maintained in the range of 10,000 to about 30,000 p.s.i.g. and wherein said polymerization temperature is maintained in the range of 200 to 500° F.

14. The process of claim 6 wherein the concentration of substituent groups in alkali metal salt form does not exceed 50 mol percent and the concentration of substituent groups in amide form does not exceed 40 mol percent.

References Cited

UNITED STATES PATENTS

| | | | |
|---|---|---|---|
| 3,029,228 | 4/1962 | Glavis | 260—86.1 |
| 3,337,517 | 8/1967 | Anspon | 260—86.7 |
| 3,349,072 | 10/1967 | Alexander et al. | 260—94.7 |
| 3,350,372 | 10/1967 | Anspon et al. | 260—86.7 |
| 3,414,552 | 12/1968 | Scanley | 260—89.7 |
| 3,429,860 | 2/1969 | Hurst | 260—86.7 |

JOSEPH L. SCHOFER, Primary Examiner

J. C. HAIGHT, Assistant Examiner

U.S. Cl. X.R.

260—86.1, 89.3, 89.5, 80.81, 78.5